A. TRAYNOR.
ARTIFICIAL FEEDING DEVICE.
APPLICATION FILED JULY 5, 1921.
1,399,828.
Patented Dec. 13, 1921.
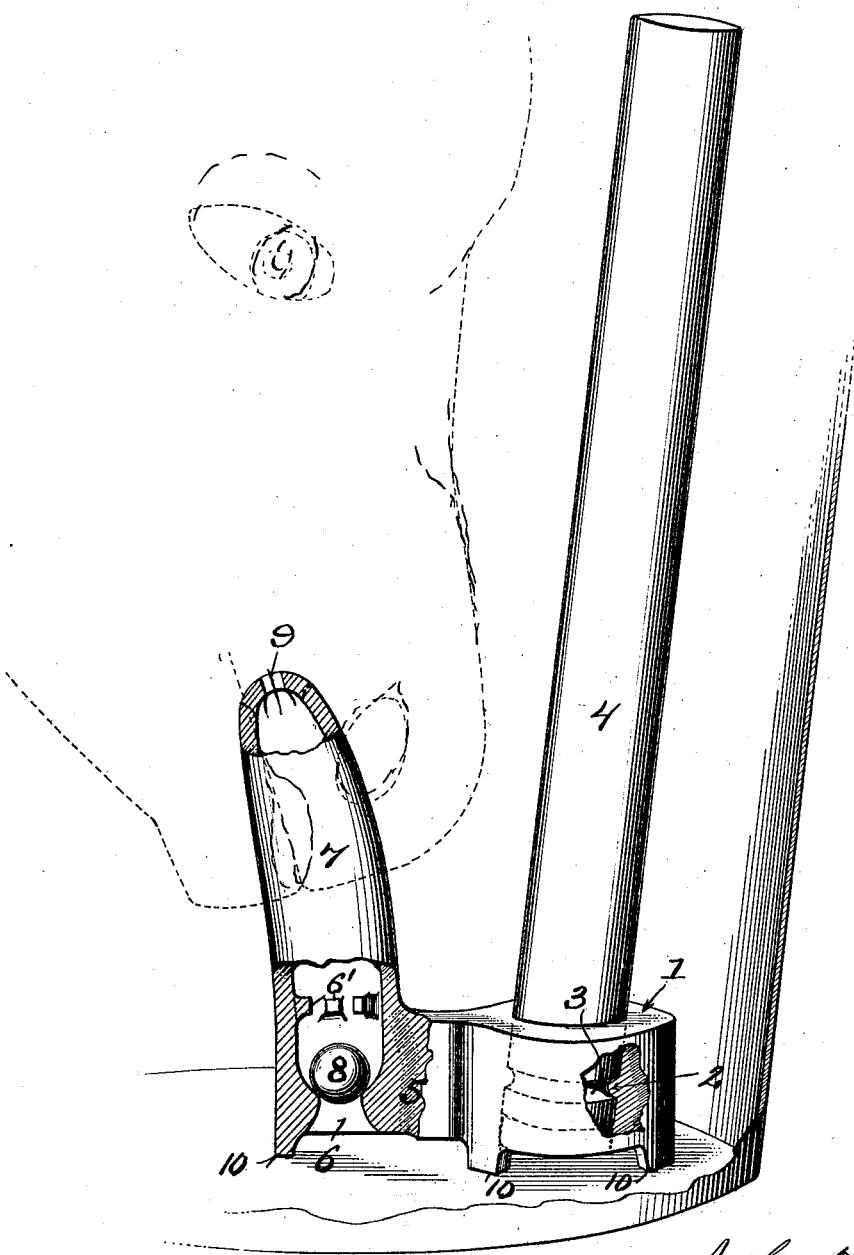
INVENTOR.
Arthur Traynor
BY
ATTORNEY.

UNITED STATES PATENT OFFICE.

ARTHUR TRAYNOR, OF KOSHKONONG, WISCONSIN.

ARTIFICIAL-FEEDING DEVICE.

1,399,828. Specification of Letters Patent. Patented Dec. 13, 1921.

Application filed July 5, 1921. Serial No. 482,526.

*To all whom it may concern:*

Be it known that I, ARTHUR TRAYNOR, a citizen of the United States, and resident of Koshkonong, in the county of Jefferson and State of Wisconsin, have invented certain new and useful Improvements in Artificial-Feeding Devices; and I do hereby declare that the following is a full, clear, and exact description thereof.

My invention refers to artificial feeding devices for calves or other nursing animals, and it has for its object to provide a simple, economical and effective device which can be immersed in a fluid container, whereby the contents thereof, can be sucked therefrom, through a nipple which is held in position by the operator.

With the above object in view, the invention consists in certain peculiarities of construction and combination of parts as are hereinafter set forth, with reference to the accompanying drawings and subsequently claimed.

The drawing illustrates an elevation of a feeding device, embodying the features of my invention, the same being shown immersed in a pail of liquid, and partly broken away and in section to more clearly illustrate the detail of construction.

Referring by characters to the drawings, 1 represents an expansible base ring, the bore of which is formed with an inwardly extended clencher bead 2, which bead is provided for engagement with an annular groove 3 in the lower end of a handle 4, whereby said handle is firmly secured. The base ring has extended therefrom, a heel 5, which heel is formed with a suction intake port 6 at its bottom face, the port being in communication with a hollow suction nipple 7, which extends upwardly from the heel and is preferably flared outwardly to a certain degree, whereby a clearing space is had between the wall of the nipple and the handle, for the purpose of permitting the animal to suck the nipple freely without coming in contact with said handle.

The bore of the nipple in this instance, is provided with a series of inwardly extended flexible nibs 6', which nibs restrict the bore at a point slightly above the contracted opening of the port 6. Thus a check ball 8 can be pushed through the nibs in such manner that they will form a cage for said bore 8 between its sealing point upon the suction port and the plane of the nibs, to thereby prevent the ball from being inadvertently drawn upwardly into the apertured end 9 of the nipple.

In this exemplification of my invention, the apertured end 9 of the nipple is preferably slotted so as to permit insertion of the ball, or said ball can be inserted through the bottom port in some instances, due to the fact that the nipple and associated parts are all molded in a single piece preferably from material composed basically of rubber.

As shown in the drawing, the bottom face of the base ring and heel are molded with projecting feet 10, which feet serve to support the device above the bottom line of the pail or container, whereby liability of sealing the intake port is eliminated, when the device is resting directly upon the bottom of the pail in operation. Obviously the party supporting the handle 4 will hold the device in such a position with relation to the top line of the milk or other fluid, so that the ring and heel are immersed therein, and the nipple only is extended above the fluid line. Hence the animal can conveniently suck the contents of the pail, which contents, as it gradually falls in level, will be followed downwardly by a movement of the feeding apparatus to maintain its normal position with relation to the fluid level.

While I have shown and described one simple exemplification of my invention, obviously in some cases, the valve mechanism may be varied within the scope of the claims.

I claim:

1. As a new article of manufacture, an animal feeding device adapted to be immersed in a liquid container, comprising a one-piece rubber head, including an expansible base ring for the reception of a handle, a heel offset from the base ring and a flexible nipple extending upwardly from the heel, the heel being provided with a valve controlled suction intake port, extending therethrough and in communication with the base of the nipple.

2. As a new article of manufacture, an animal feeding device adapted to be immersed in a liquid container, comprising a one-piece rubber head, including an expansible base ring, the bore of which is provided with a bead, a handle having a grooved end engaging the bore of the base ring and bead, a heel extending from the base ring, having a port therein, a flexible suction nipple extending upwardly from the heel in communication with the port, the bore of the nipple being of greater diameter than the port bore, and a caged valve ball mounted in the bore of the nipple and adapted to close the port.

In testimony that I claim the foregoing I have hereunto set my hand at Milton, in the county of Rock, and State of Wisconsin.

ARTHUR TRAYNOR.